Feb. 25, 1969 A. A. KELLAR ET AL 3,429,759
HIGH TEMPERATURE CEMENT
Filed June 17, 1963
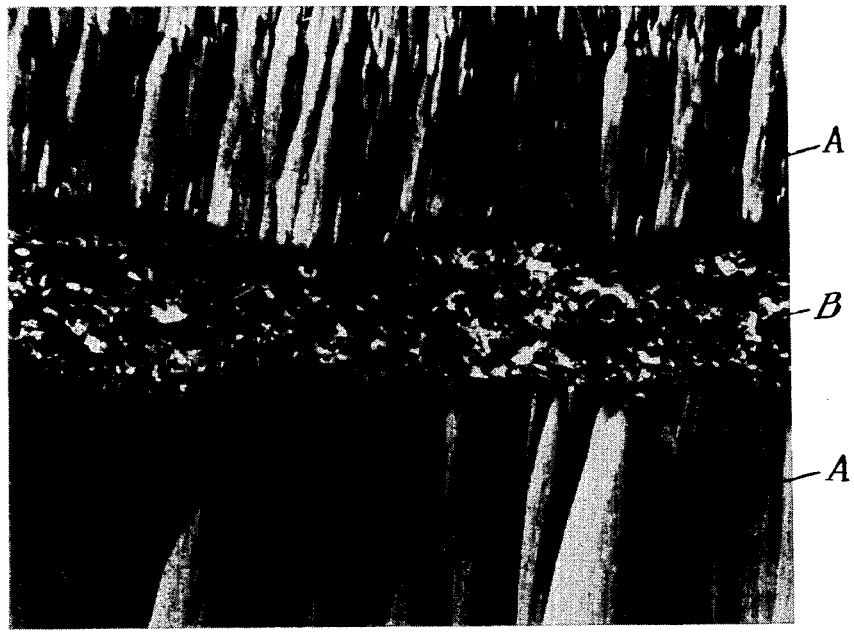
INVENTORS
ARNOLD A. KELLAR
MORRIS B. CARTER
BY
ATTORNEY

United States Patent Office 3,429,759
Patented Feb. 25, 1969

3,429,759
HIGH TEMPERATURE CEMENT
Arnold A. Kellar and Morris B. Carter, Lawrenceburg, Tenn., assignors to Union Carbide Corporation, a corporation of New York
Filed June 17, 1963, Ser. No. 290,576
U.S. Cl. 156—155                                     4 Claims
Int. Cl. C09j 3/00

This invention relates to a cement for joining carbonaceous articles, and more particularly, to a cement which retains its joint strength at high temperatures.

Carbonaceous shapes are often assembled by bonding a plurality of carbonaceous segments together. When the thus assembled shapes are intended for use in high temperature applications such as in rocket nozzles or as nose cones, the bonding medium must retain its effectiveness at high temperatures. In addition, such carbonaceous shapes generally are fabricated from graphite material which is characterized by a high density and low porosity. The bonding medium for such shapes cannot therefore rely on porosity in the graphite to provide a gripping surface.

Accordingly, the principal object of the invention is to provide a cement which retains its joint strength over the temperature range of room temperature to 3000° C. and above.

Another object of the invention is to provide high temperature cement which is suitable for use with high density graphites, such as pyrolytic graphite.

Broadly stated, the objects of the invention are accomplished by a cement which comprises finely divided titanium diboride particles which are bonded together by a carbonizable binder.

Among the many carbonizable binders which are suitable for use in the practice of the invention are coal tar pitch, petroleum pitch, phenol formaldehyde resins and sugar. The preferred binder is a mixture which comprises 25 percent by weight furfural, 25 percent by weight furfuryl alcohol, and 50 percent by weight phenol formaldehyde. The preferred concentration range of this binder is 40 to 60 parts by weight binder per 100 parts by weight titanium diboride.

The size of the titanium diboride particles is critical to the success of the invention and in order to obtain satisfactory cement all the particles must be finer than 200 Tyler mesh, i.e. all through a 74 micron screen opening. However, an average particle size below about 4 microns should be avoided since such extremely small particles allow the joint to be so thin that the carbonaceous binder is depleted by dispersion into the surface of the members to be joined.

In addition, stearic acid in a range of up to 5 parts by weight per 100 parts by weight of titanium diboride may be optionally added to the cement. Stearic acid is immiscible with furfural and furfuryl alcohol and it imparts permeability to the cement during the curing step by sweating out of the cement and leaving pores. Other materials suitable for this purpose are petroleum base greases, oils and other liquifiable material which is immiscible with furfural and furfuryl alcohol, such as paraffin.

Carbon or graphite segments may be joined by the cement of the invention in either of two ways. The surfaces to be cemented may be either ground or not ground, the only requirement being that they are reasonably flat and parallel to one another. In addition, the best results are also obtained if the surfaces are moisture free.

In one method, the surfaces to be joined are coated with the cement and then they are clamped together under pressure to form a thin joint. The cement in the joint is then cured. The exact curing temperature and time varies with the particular binder which is employed and with the size of the joint. The best time and temperature for a specific binder and size will be readily apparent to one skilled in the art.

After curing, the article resulting from the joined segments may be machined or otherwise worked upon and is ready for applications at high temperatures in excess of at least 2200° C. at any time.

In the second method, after curing as above, the joint is heated in an inert atmosphere to a temperature in excess of at least about 2200° C. prior to its ultimate use at such temperatures.

In either event, when the joined article is heated to temperatures in excess of 2200° C. ±50° C., the titanium diboride which is liquid at this temperature dissolves the graphite at the interface of the joined segments and the carbonizable substance in the binder (which is graphite at this temperature). The thus formed solid solution forms an excellent bond upon cooling. Until such interaction between the titanium diboride and the graphite occurs, the binder in the cement alone imparts sufficient bond strength to the joint so that the joined article may be worked upon.

The bond which is formed between the segments being joined by the above discussed interaction is clearly observable in the drawing wherein the sole figure is a photomicrograph which has been magnified 100 times. In the photomicrograph, the reference character A identifies pyrolytic graphite and the reference character B identifies the reacted cement of the invention.

Illustrative of the success of the cement of the invention is the following:

A carbonizable cement embodying the invention was prepared by mixing 100 parts by weight titanium diboride particles of a fineness through 200 Tyler mesh, 47 parts by weight of the above-identified preferred binder and 2 parts by weight stearic acid. This mixture was applied to the surfaces of a number of high density graphite pieces, pairs of which were pressed together to form about a 3/32 of an inch thick joint. The cement which formed the joint was then cured to a temperature of 110–120° C. in 16 hours.

A portion of the thus joined members were then heated to a temperature of 2750° C. to cause the titanium diboride-graphite reaction to occur.

The average flexural strengths for both the cured and the cured and heated joints were then determined by single point loading of a 1.25 cm. span at the following temperatures:

| Temperature | Flexural strength, p.s.i. | |
|---|---|---|
| | Cured and heated | Cured |
| Room temperature | 3,179 | 2,075 |
| 500° C | | 2,805 |
| 1,000° C | 3,854 | 1,276 |
| 1,750° C | 2,169 | 1,724 |
| 2,500° C | 1,856 | 1,409 |

It will be appreciated from the above that joints which are made by the cement of the invention have good flexural strength over the entire range from room temperature to 2500° C. both with and without pre-heating to such temperatures.

A further test was made with a scale-down nozzle in a static firing station. The nozzle was cut into eight segments and cemented with the above thermosetting cement. After a cure of 16 hours to 120° C. the joined nozzle was pre-heated to 2750° C. The nozzle was then installed in a 6 inch solid fuel motor and fired 72 seconds at 5500° F. and 1000 p.s.i. After firing, the nozzle joints displayed excellent strength. Erosion rate was normal for the basic graphite grade.

The cement of the invention after being mixed should be used immediately, although it may be stored for up to 30 days under refrigeration. The cement of the invention may be provided as a two component composition, the binder and stearic acid or equivalent in one container, and the titanium diboride in the other, to give a cement with an unlimited shelf life.

We claim:

1. A cement for joining pyrolytic carbon or graphite articles which comprises titanium diboride particles having a particle size of less than 74 microns and a carbonizable binder, said binder comprising 25 weight percent furfural, 25 weight percent furfuryl alcohol and 50 weight percent phenol formaldehyde and being present in a range of from about 40 to 60 parts by weight per 100 parts by weight of said titanium diboride.

2. The cement of claim 1 wherein stearic acid in a range of up to 5 parts by weight per 100 parts by weight of titanium diboride is also added.

3. A cement for joining carbon or graphite articles which comprises 100 parts by weight finely divided titanium diboride particles, said particles all being of a size of 74 microns or less with the average particle size being above 4 microns, 47 parts by weight carbonizable binder which comprises 25 weight percent furfural, 25 weight percent furfuryl alcohol and 50 weight percent phenol formaldehyde, and 2 parts by weight stearic acid.

4. A method for joining high density graphite segments which comprises preparing a cement comprising particles of finely divided titanium diboride and a carbonizable binder, said binder capable of yielding bond forming carbon at temperatures of less than 2200° C. and being present in a range of from about 40 to 60 parts by weight per 100 parts by weight of said titanium diboride and said titanium diboride having a particle size of 74 microns or less, providing the segments to be joined with flat, parallel and moisture free opposed surfaces, coating the surfaces to be joined with said cement, clamping said segments together to form a thin joint, curing said cement in said joint and subsequently heating said cement in said joint to a temperature of at least about 2200° C.

References Cited

UNITED STATES PATENTS

| 2,992,960 | 7/1961 | Leeg et al. | 161—249 X |
| 3,120,453 | 2/1964 | Fitzer et al. | 117—217 |
| 3,132,979 | 5/1964 | Biekerdike et al. | 156—89 |
| 3,140,967 | 7/1964 | Kaufmann et al. | 156—91 |
| 3,165,864 | 1/1965 | Shulze | 50—464 |
| 3,175,918 | 3/1965 | McGahan et al. | 106—41 |
| 3,187,502 | 6/1965 | Stover | 60—35.6 |

FOREIGN PATENTS 618,367  2/1949  Great Britain.

EARL M. BERGERT, *Primary Examiner.*

C. B. COSBY, *Assistant Examiner.*

U.S. Cl. X.R.

156—335; 260—18, 56